United States Patent [19]

Lacon

[11] 4,076,479
[45] Feb. 28, 1978

[54] APPARATUS FOR FORMING ARTICLES OF FIBROUS MATERIALS

[75] Inventor: John W. Lacon, Sarnia, Canada

[73] Assignee: Fiberglas Canada Ltd., Toronto, Canada

[21] Appl. No.: 758,512

[22] Filed: Jan. 11, 1977

Related U.S. Application Data

[60] Continuation-in-part of Ser. No. 607,963, Sep. 26, 1975, abandoned, which is a division of Ser. No. 346,381, Mar. 30, 1973, Pat. No. 3,912,572.

[30] Foreign Application Priority Data

Feb. 1, 1973 Canada .................................. 162625

[51] Int. Cl.$^2$ ............................................. B29C 3/04
[52] U.S. Cl. ..................................... 425/301; 425/83.1; 425/306; 425/393; 425/404; 425/DIG. 201
[58] Field of Search ................. 425/301, 83, 404, 182, 425/500, 306, DIG. 201, 392, 393, 502, 508, 513, 521; 264/258, 259; 156/461, 466

[56] References Cited

U.S. PATENT DOCUMENTS

| | | | |
|---|---|---|---|
| 2,906,317 | 9/1959 | Keyes | 156/62.6 |
| 2,997,096 | 8/1961 | Morrison et al. | 156/381 X |
| 3,093,532 | 6/1963 | Miller et al. | 264/258 X |
| 3,147,165 | 9/1964 | Slayter | 425/83 X |
| 3,150,025 | 9/1964 | Slatter et al. | 425/83 X |
| 3,150,025 | 9/1964 | Slayter et al. | 425/83 X |
| 3,242,527 | 3/1966 | Rosenberg | 425/DIG. 201 |
| 3,583,030 | 6/1971 | Terry et al. | 425/DIG. 201 |
| 3,661,491 | 5/1972 | Troyer | 425/306 X |
| 3,819,435 | 6/1974 | Roberts et al. | 425/83 X |

Primary Examiner—Robert L. Spicer, Jr.
Attorney, Agent, or Firm—Sughrue, Rothwell, Mion, Zinn and Macpeak

[57] ABSTRACT

Apparatus for forming articles, e.g. one-piece pipe insulators, from a longitudinally advancing strip-shaped felt of fibrous material has a housing around tubular inner and outer dies, a gas supply through openings in the outer die for curing the felt as the felt is pulled between the dies from beyond the dies and a transverse cutter for cutting the cured felt to length. To facilitate easy replacement of the outer die, e.g. by another outer die of different transverse size or shape, the housing has openings larger than the cross-section of the outer die for receiving the outer die therethrough, and readily releasable closure plates around the outer die close the housing openings. The outer die may comprise separable sections connected end-to-end.

22 Claims, 24 Drawing Figures

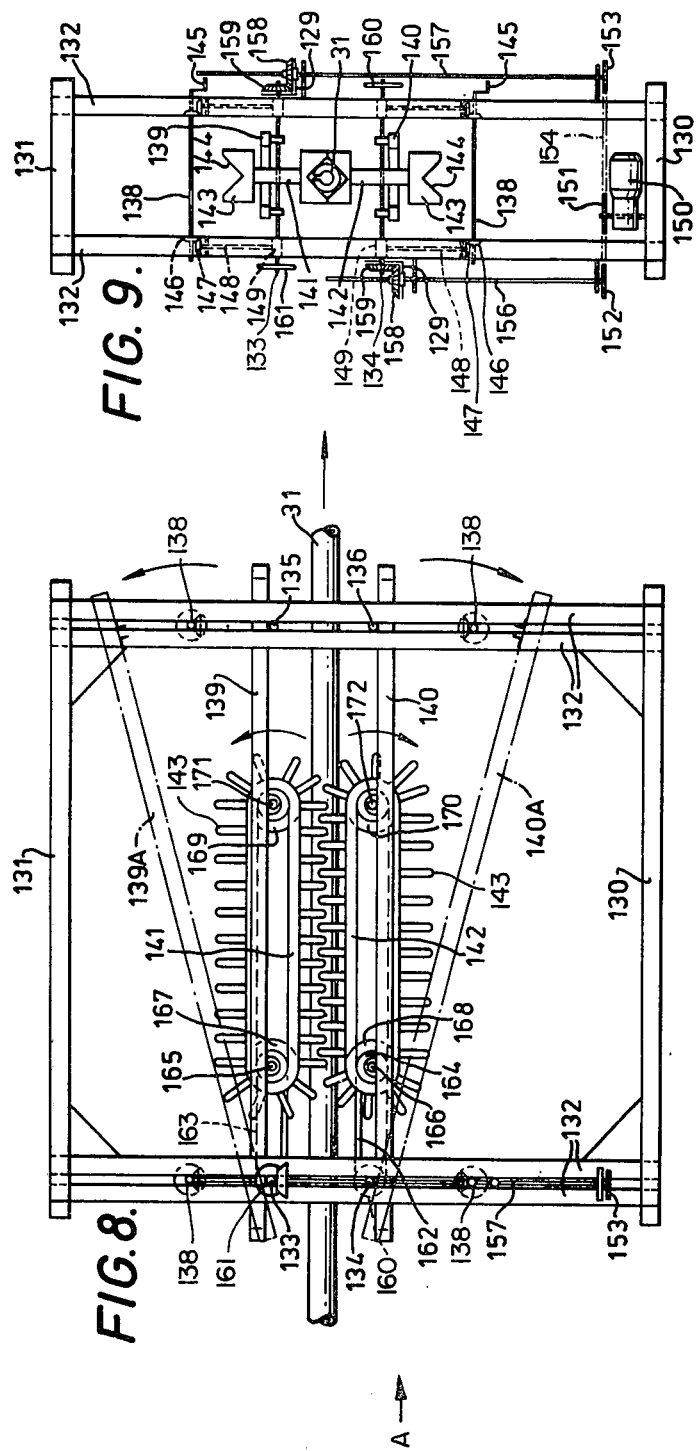

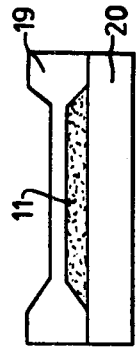
FIG. 10A.
FIG. 10B.
FIG. 10C.
FIG. 10D.
FIG. 10E.
FIG. 10F.
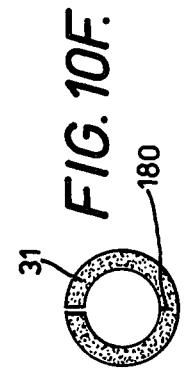
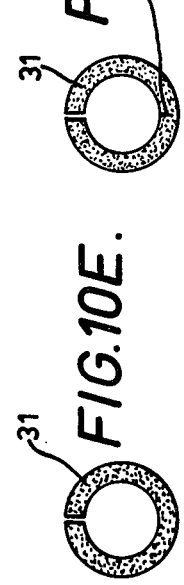
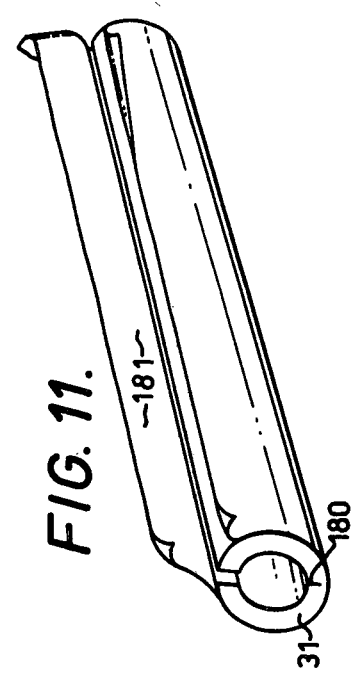
FIG. 11.
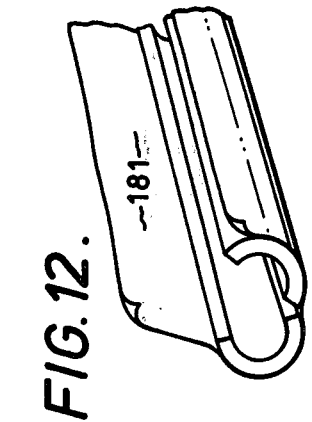
FIG. 12.

APPARATUS FOR FORMING ARTICLES OF FIBROUS MATERIALS

CROSS-REFERENCES TO RELATED APPLICATIONS

This application is a continuation-in-part of patent application Ser. No. 607,963 filed Aug. 26, 1975, now abandoned, which was divided from patent application Ser. No. 346,381, filed Mar. 30, 1973, now U.S. Pat. No. 3,912,572.

FIELD OF THE INVENTION

The present invention relates to methods of and apparatus for forming articles from strip-shaped felts of fibrous material, for example glass fibre insulating wool, containing a hardenable bonding material, e.g., an uncured thermo-setting bonding material.

One important application of the present invention is to the manufacture of longitudinally split cylindrical thermal insulation coverings for hot and cold pipes, which coverings are commonly referred to as "one piece pipe insulator sections" and are kerfed opposite their slots to enable them to be opened sufficiently wide to be fitted over a pipe, after which they snap into a closed condition around the pipe when released.

However, the invention is not restricted to the manufacture of one-piece pipe insulator sections, and may with advantage be employed for making other articles, for example of rectangular, segmental, arcuate or irregular cross-section, from felts of fibrous material.

DESCRIPTION OF PRIOR ART

Uncured glass fibre wool in the condition in which it is normally delivered to apparatus for forming it into pipe insulator sections has a low bulk density and a non-uniformly low strength under tension and, due to tackiness caused by its hardenable bonding material, usually an uncured resin, causes considerable friction when moved in sliding contact over a surface. Consequently, the feeding of a strip-shaped felt of uncured glass fibre wool under tension through processing apparatus for forming articles therefrom can present serious difficulties in avoiding breakage of the felt.

It has previously been proposed to form one piece pipe insulator sections from such felt by winding the felt around a mandrel and curing the felt while the felt remains wound on the mandrel. The mandrel may be smooth or may be perforated to allow hot gases to be fed radially through the mandrel and the felt for curing the felt. However, if the wound felt is caused to slide along the mandrel while the latter remains stationary, there is considerable friction between the felt and the mandrel, particularly if a perforated mandrel is employed, and this friction is increased as wool and resin detritus tend to accumulate on the mandrel. To partially overcome this difficulty, the mandrel may be moved longitudinally together with the felt wound thereon. In either case, however, careful and technically difficult control is required of the angle at which the felt is fed onto the mandrel. This angle, and the width of the felt, depend on the diameter and thickness of the tubular insulation being produced. Consequently, variations in the outer diameter of the wound felt are produced by variations in the overlap of successive convolutions of the felt on the mandrel, and these outer diameter variations are at best unsightly and at worst unacceptable when two or more pipe insulator sections are required to fit closely over one another around a pipe. These variations may be overcome by the use of shaping tools for shaping the outer diameter of the wound felt, as disclosed for example in Canadian Pat. No. 897,941, which teaches the use of frusto-conical rollers rotating on the outer surface of the wound felt, but the use of such shaping tools increases the mechanical complexity of the apparatus and the drag on the felt.

Canadian Pat. No. 570,945 discloses a method in which the felt wound on the mandrel is encased in a pair of perforated mold members, and the encased assembly, including the mandrel, is then advanced through a curing zone. This method has the disadvantage that the rate of production of the insulation is limited by the need to repeatedly fit the perforated mold members around the wound felt, and by the limited size of a roll of the felt which can be rotated around the mandrel for winding the felt on the mandrel.

Moreover, the above-described prior methods employing an advancing mandrel have the further important disadvantages that the rate of production is slowed by the necessity for repeatedly fitting new mandrel sections to the end of the mandrel, and also that they require considerable capital investment in equipment, and in particular in mandrels and mold members of different diameter in order to be able to produce insulation of various diameters. In this connection, it is pointed out that the production of a range of different insulation diameters is important in practice to provide insulation sizes which can fit different pipe diameters and which can be fitted in nesting relationship over one another around a pipe.

In Canadian Pat. No. 713,014 there is disclosed an apparatus for the continuous production of tubular insulation by feeding the felt onto an endless wire mesh belt. A series of separate mandrels carried on an endless chain above the belt move in succession into contact with the felt, which is then wrapped, with the belt, around the successive mandrels by a shoe-horn former. The wrapped belt and felt then advance with the mandrels through a baking tube for curing the felt to form a longitudinally split tube. This prior arrangement has the disadvantage that a plurality of identical mandrels are required for each required different internal diameter of the insulators, and a different width of wire mesh belt is required for each required different external diameter, and consequently considerable capital investment in equipment is necessary. In addition, replacement of the mandrels, their endless chain and the wire mesh belt each time the apparatus is changed over to the production of a different size of insulator is time consuming and expensive. Also, gaps between the mandrels wrapped by the felt produce corresponding irregularities on the internal surfaces of the insulators.

U.S. Pat. No. 3,661,491, issued May 9, 1972, discloses apparatus for consolidating, shaping and fixing a loose mass of fibres which employs a pair of stationary, spaced-apart heated platens. The mass of fibres is fed between smooth opposed surfaces of the platens to compress the mass and to heat cure a heat activable binder in the fibre mass. The fibre mass is fed on an endless conveyor to the platens and, to facilitate the compression of the fibre mass by the platens, the latter are formed with tapered portions forming an inlet which converges in the direction of travel of the fibre mass between the platens. However, in practice, this prior arrangement will have the disadvantage that the heating of the binder as the fibre mass slides between the stationary heated platen surfaces will be sufficient to cure the binder only to a limited depth across the thickness of the compressed fibre mass. Moreover, the fibre mass will tend to bunch at the inlet, since the compression of the fibre mass by the tapered portions of the platens will result in a high degree of friction between the fibres and the surfaces of the platens, particularly since the fibre mass contains uncured binder.

As the conveyor continues to feed more of the fibre mass to the inlet, the bunching of the fibre mass at the inlet will result in jamming of the fibre mass and prevent travel of the fibre mass between the heated platens and the bunched-up fibre mass will be partially cured by the platens in a shape which will not fit between the platens.

U.S. Pat. No. 3,147,165, issued Sept. 1, 1964 to G. Slayter, teaches the manufacture of pipe insulation from loose glass fibres by means of a screw-type conveyor rotatably mounted on a mandrel for feeding the fibres through a cylindrical mold extending around the screw-type conveyor and the mandrel. Plenum chambers are provided around the cylindrical mold for directing hot gas through holes in the mold. However, no provision is made for replacement of the mandrel and mold by corresponding parts having different cross-sectional dimensions, and consequently this prior apparatus can only be employed for producing one size of pipe insulator sections.

OBJECT OF THE INVENTION

It is accordingly an object of the present invention to provide a novel and improved apparatus for the continuous formation of articles from an uncured strip-shaped felt of fibrous material, which apparatus facilitates change-over to the production of articles of different cross-sections and enables the continuous production of such articles with regular surfaces.

SUMMARY OF THE INVENTION

According to the present invention, apparatus for forming articles from a longitudinally advancing strip-shaped felt of fibrous material containing hardenable bonding material comprises inner and outer stationary forming surfaces on inner and outer dies which are spaced apart to receive the advancing felt therebetween. The outer die is formed with openings for the flow of hot gas through the felt, and a housing extends around the outer die for confining the hot gas flow, the outer die extending through openings in the housing which are larger than the transverse dimensions of the outer die to enable replacement of the latter by an outer die of different cross-sectional size and/or shape. Closure plates extend around the outer die for closing the openings and supporting the outer die, and are secured to the housing by bolts or other readily releaseable securing means. A burner within the housing or communicating therewith serves to supply the hot gas for curing the felt as the felt passes through the outer die. A gripping and pulling mechanism for pulling the felt, and a transverse cutter, are provided beyond the outer die.

Since the openings in the housing are larger than the cross-section of the outer forming die, and since the closure plates are readily releasable, the outer forming die can be easily and conveniently removed from the housing to enable replacement thereof by a different outer forming die which may for example, be of larger or smaller cross-section or may have a different cross-sectional shape.

This possibility of replacement of the outer forming die is of considerable importance in actual utilization of the apparatus since, in practice, the construction of a manufacturing plant incorporating the apparatus requires considerable capital expenditure, and it is economically essential to be able to employ that plant for the production of articles of different sizes.

To facilitate the manufacture, handling, storage, assembly in the apparatus and replacement of outer dies of relatively large diameter, the invention further provides that the outer die may be formed of a plurality of separable sections which can be connected together in end-to-end relation by telescopic interengagement of their ends.

Furthermore, the housing may be provided with internal partitions and valves to control the flow of the hot gas in such a manner that the amount of hot gas passed through the felt at different sections along the outer die can be independently controlled in order to improve the control of the curing of the felt as the felt advances through the outer die past the successive outer die sections.

BRIEF DESCRIPTION OF THE DRAWINGS

The invention will be more readily understood from the following description of two embodiments thereof given by way of example with reference to the accompanying drawings, in which:

FIG. 8 shows a side view of a gripper mechanism forming part of the apparatus of FIGS. 1A and 1B;

FIG. 9 shows an end view of the gripper mechanism taken in the direction of arrow A in FIG. 8;

FIGS. 10A to 10F show views taken in transverse cross-section through a mineral wood felt during successive stages of the formation of the felt into a pipe insulation section;

FIG. 11 shows a view in perspective of a one-piece pipe insulation section formed by the apparatus of FIGS. 1A and 1B;

FIG. 12 shows a broken-away view in perspective of part of the insulation section of FIG. 11 in an opened condition;

DESCRIPTION OF PREFERRED EMBODIMENTS

Figure 1:
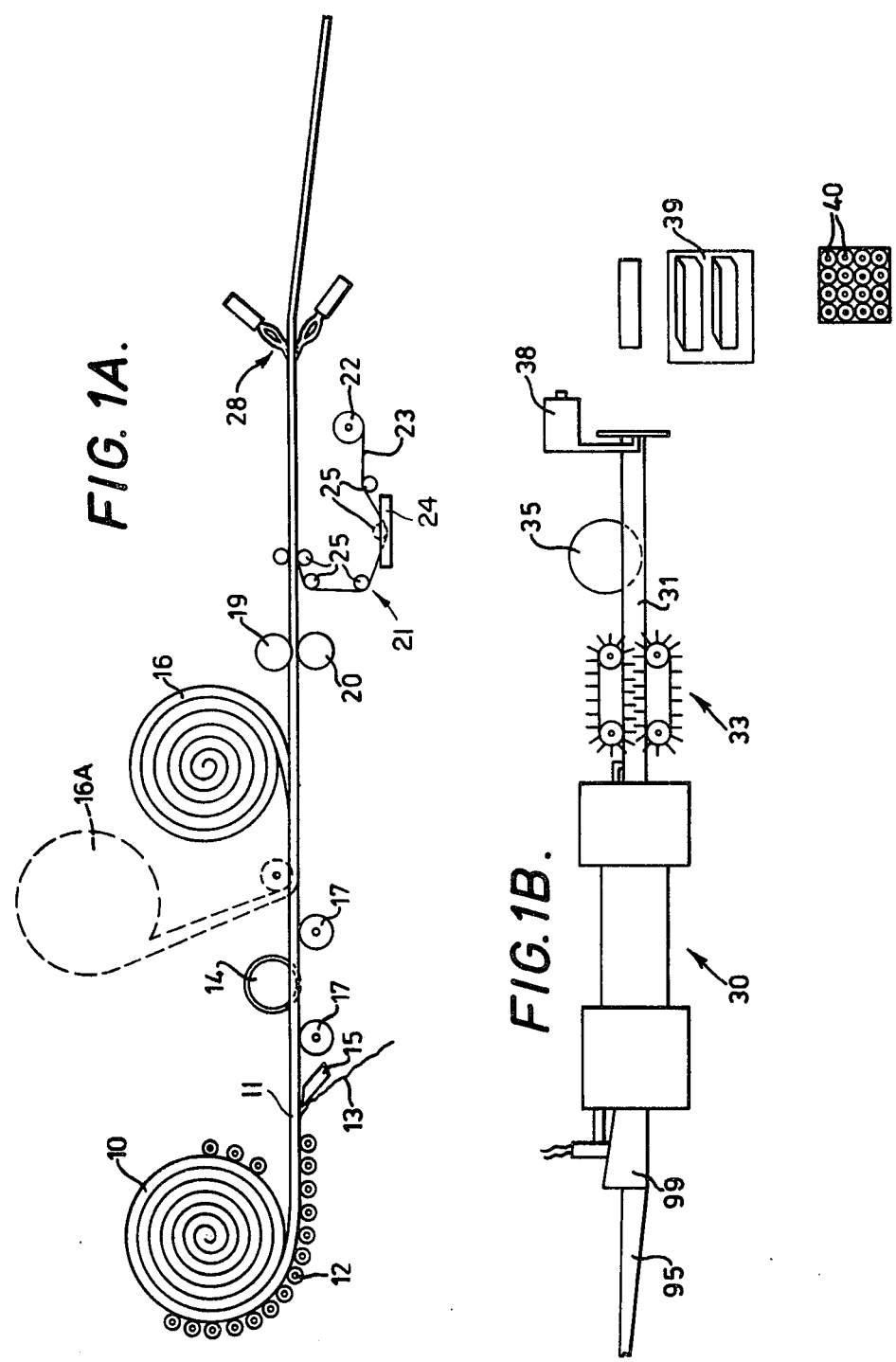
FIGS. 1A and 1B show a diagrammatic side view of an apparatus for forming one-piece pipe insulation sections.

The apparatus shown in FIGS. 1A and 1B is intended primarily for the continuous production of longitudinally split cylindrical one-piece pipe insulation sections from uncured mineral wool felt containing a hardenable bonding material in the form, for example, of an uncured resin. However, as will be described later in greater detail, this apparatus can readily be adapted for the formation of articles of various cross-sections from the same material.

At the left hand end of the apparatus, as viewed in FIG. 1A, a supply coil, indicated generally by reference numeral 10, of uncured strip-shaped mineral wool felt 11 is supported on a plurality of freely rotatable support rollers 12.

Since the felt 11 in the supply coil 10 contains an uncured resin, a strip of paper 13 is interleaved between the layers of the supply coil 10 to prevent these layers from adhering to one another. A stripper 15 is provided after the rollers 12 for stripping the paper 13 from the underside of the felt 11.

Forwardly of the supply coil 10, in the direction of advance of the felt 11 during operation of the apparatus, the apparatus includes a plurality of successive felt treatment sections at which the felt is subjected to successive treatments to convert the felt into longitudinally split cylindrical pipe insulation sections during its travel.

The first of these sections is provided with a circular cutter 14 which may be one of a pair of co-axial cutters, the periphery of which extends into the path of the felt 11 and which serves to cut the felt 11 longitudinally to the width required to form the insulation sections. While being cut by the cutter 14, the felt 11 is supported on support rollers 17, which are freely rotatable about horizontal axes. Superfluous felt is wound onto a take-up coil 16. The take-up coil may be moved to the position 16A, shown in broken lines in FIG. 1A, for use, for example, when the supply coil 10 has been exhausted.

The next section of the apparatus is a compaction section at which rollers 19, 20 are provided at opposite sides of the path of the felt 11.

The compaction section is followed by a reinforcement feed section, indicated generally by reference numeral 21, at which there is provided a supply reel 22 for a reinforcement cord 23, a bath container 24 and guide rollers 25 for guiding the reinforcement cord 23 from the supply reel 22 through the bath container 24 to the felt 11.

The next section of the apparatus is a crisping section, indicated generally by reference numeral 28, which serves to crisp the surface of the felt 11, as described in more detail below.

The crisping section 28 is followed by a forming section indicated generally by reference numeral 30. In the forming section 30, the felt 11 is deformed so that its cross-section changes from a rectangular cross-section to an annular cross-section, and the felt 11 is thereby converted into a longitudinally split cylindrical tube passing from the exit end of the forming section 30. This tube has been indicated by reference numeral 31 in FIG. 1B.

The tube 31 passes from the forming section 30 to a gripper mechanism 33, which pulls the tube 31 from the forming section 30.

Following the gripper mechanism 33, there is provided a cutter disc 35, the purpose of which is to cut a longitudinal kerf in the tube 31, as described in greater detail below. The tube 31 then passes to a transverse cutter 38, by which the tube 31 is cut transversely into separate sections of required length, which are collected and passed through an automatic wrapping machine 39 to an automatic boxing machine 40.

Figure 2:
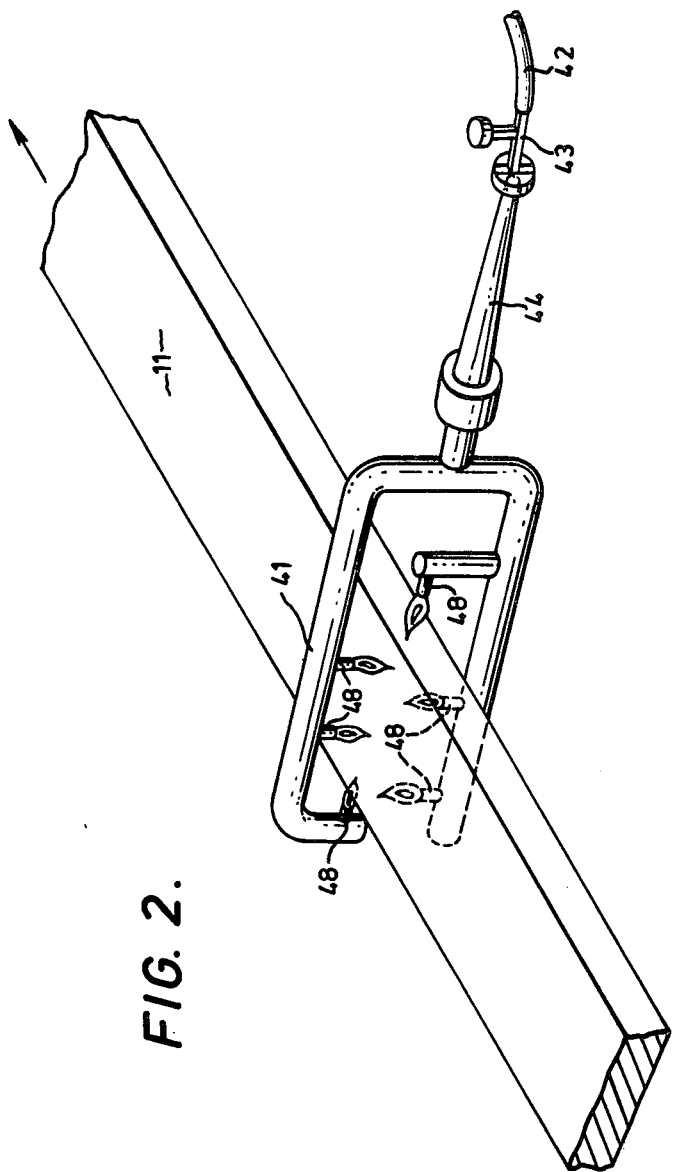
FIG. 2 shows a view in perspective of a felt crisping section forming part of the apparatus of FIGS. 1A and 1B.

The crisping unit 28 is illustrated in greater detail in FIG. 2 and has six gas burner nozzles 48 which are connected to a common gas supply manifold 41. A gas supply pipe 42, which is connected to a source of inflammable gas (not shown), supplies the gas through an on-off cock 43 and a connecting pipe 44 to the gas supply manifold 41. As can be seen from FIG. 2, the gas burner nozzles 48 are so arranged that two of them direct their flames to the upper surface of the felt 11, two of the undersurface of the felt 11, and the remaining two to the respective opposite edges of the felt 11.

Figure 3:
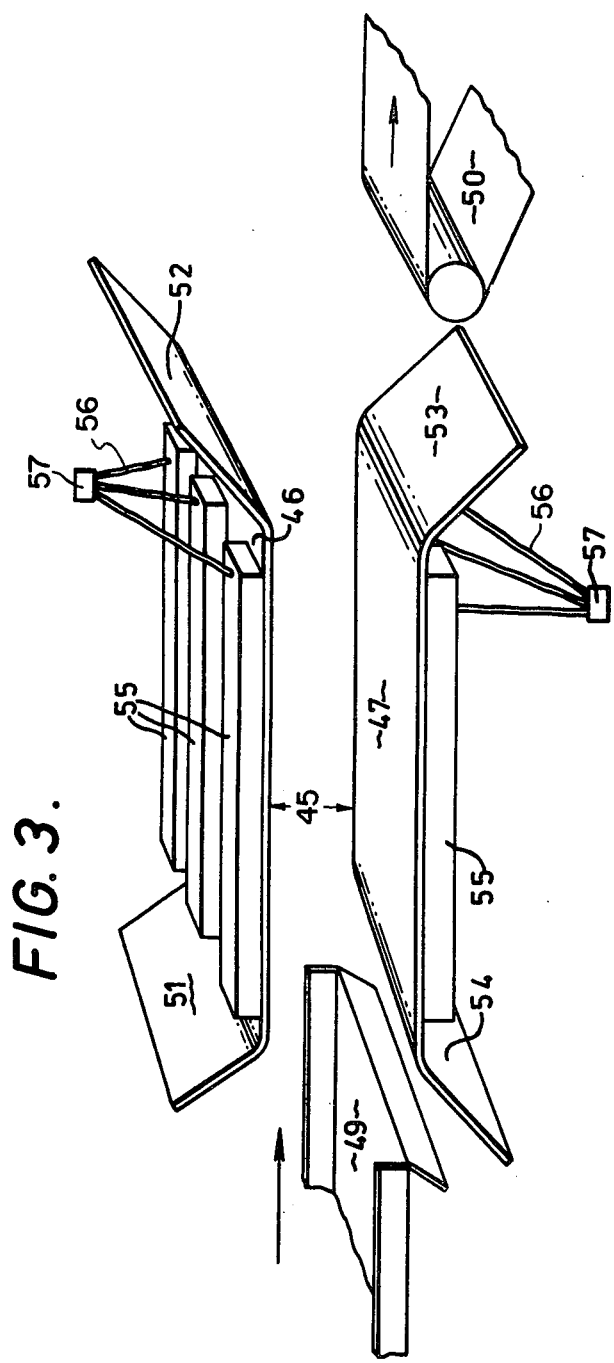
FIG. 3 shows a view in perspective of an alternative form of crisping section for use in the apparatus of FIGS. 1A and 1B.

Instead of the gas burner type of crisping unit 28 illustrated in FIG. 2, an electrically heated crisping unit illustrated in FIG. 3 and indicated generally by reference numeral 45 may be employed.

The electrically heated crisping unit 45 has an upper heater plate 46 and a lower heater plate 47, which are vertically spaced apart to allow the felt 11 to pass between them. The lower heater plate 47 is disposed in a gap between a stationary guide channel 49, along which the felt 11 slides towards the crisping unit 45, and a conveyor belt 50 for conveying the felt 11 beyond the crisping unit 45.

The upper and lower heater plates 46 and 47 are bent at the opposite ends thereof to form inclined end portions 51–54 extending away from the path of the felt 11 to facilitate travel of the felt 11 between the heater plates 46 and 47.

The upper heater plate 46 is vertically adjustable by means of an adjustment mechanism, which is not illustrated in the drawings, to enable the crisping unit 45 to be adapted to different thicknesses of the felt.

At the upper side of the upper heater plate 46, and the underside of the lower heater plate 47, there are provided heater blocks 55 containing electrical resistance heater elements (not shown) which can be connected by connection leads 56 to connecting plugs 57 for connection to a current supply network.

In use, the upper and lower heater plates 46 and 47 are heated by the heater blocks 55 and contact opposite surfaces of the felt 11 as the latter moves from the guide channel 49 to the conveyor belt 50, thereby at least partly curing the hardenable bonding material at and adjacent those surfaces of the felt.

Referring now to FIGS. 4 to 7 of the accompanying drawings, the forming unit 30 is provided with a housing or casing having a cylindrical inlet portion 60, a cylindrical outlet portion 61 and a cylindrical intermediate portion 62 extending between and connecting the inlet and outlet portion 60 and 61.

Figure 4:
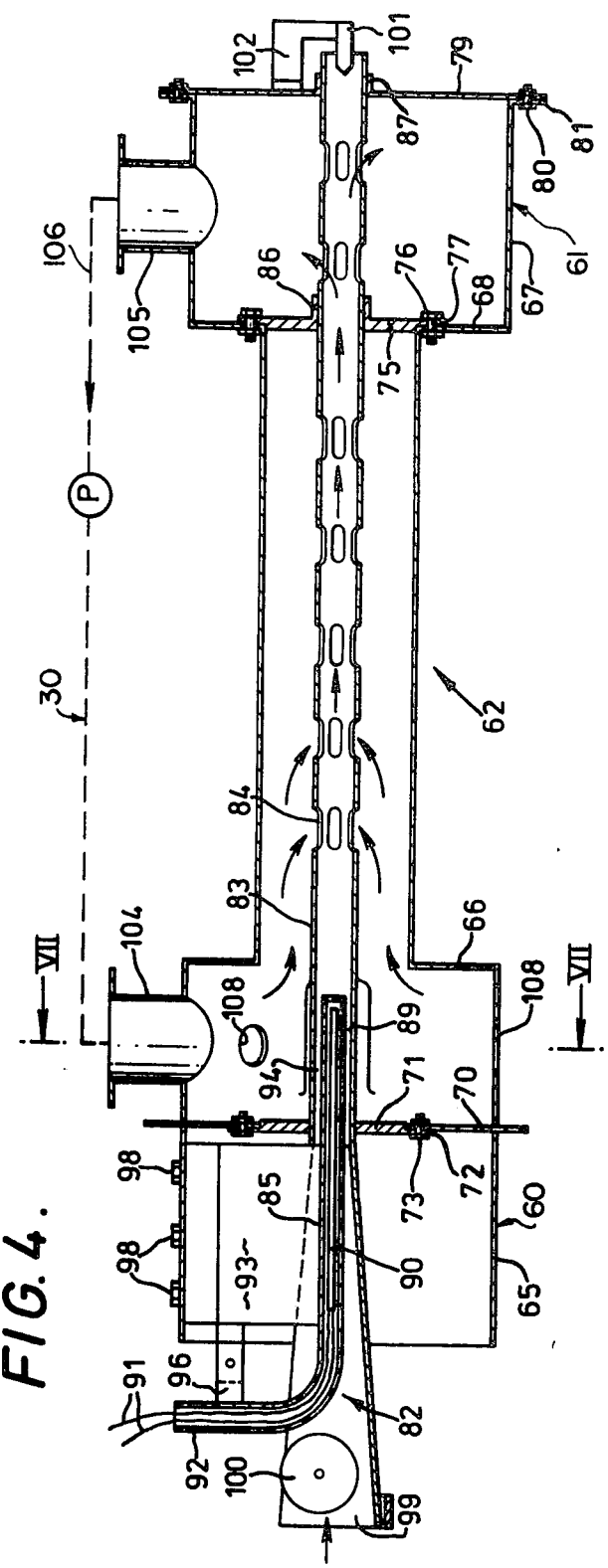
FIG. 4 shows a view taken in longitudinal cross-section through a forming section which is part of the apparatus shown in FIGS. 1A and 1B.

The inlet portion 60 of the casing has a cylindrical wall 65 which is open at its left-hand end, as viewed in FIG. 4, and which at its opposite end is connected to a radially-inwardly extending annular wall 66. The outlet portion 61 of the casing has a cylindrical wall 67 connected at its left-hand end, as viewed in FIG. 4, to a radially-inwardly extending flat annular wall 68, and the cylindrical intermediate portion 62 of the casing extends between and is connected to the inner peripheries of the annular walls 66 and 68.

The cylindrical wall 65 of the inlet portion 60 of the casing is provided with a transverse partition wall 70 formed with a central circular opening into which fits a circular support plate 71. The circular support plate 71 is formed with a peripheral flange 72 which is connected by bolts 73 to the partition wall 70.

A further circular support plate 75 is provided at the right-hand end of the intermediate portions 62, as viewed in FIG. 4, by bolts 76 co-operating with a flange 77 on the circular support plate 75 and with the flat annular wall 68 of the casing outlet portion 61.

A circular plate 79 is secured by bolts 80 to a radially-outwardly extending flange 81 at the outlet end of the casing outlet portion 61.

Although not shown in the drawings, the bolts 73, 76 and 80 may be replaced by quick-acting toggle clamps enabling the support plates 71, 75 and 79 to be readily secured in position or released therefrom.

An outer die 83 extends co-axially with the casing inlet, outlet and intermediate portions 60, 61 and 62 and through circular openings in the support plates 71, 75 and 79. The outer die 83 is in the form of a cylindrical pipe perforated by a number of longitudinally extending openings 84 which are distributed longitudinally and circumferentially of the outer die 83 and the purpose of which is explained below.

Figure 6:
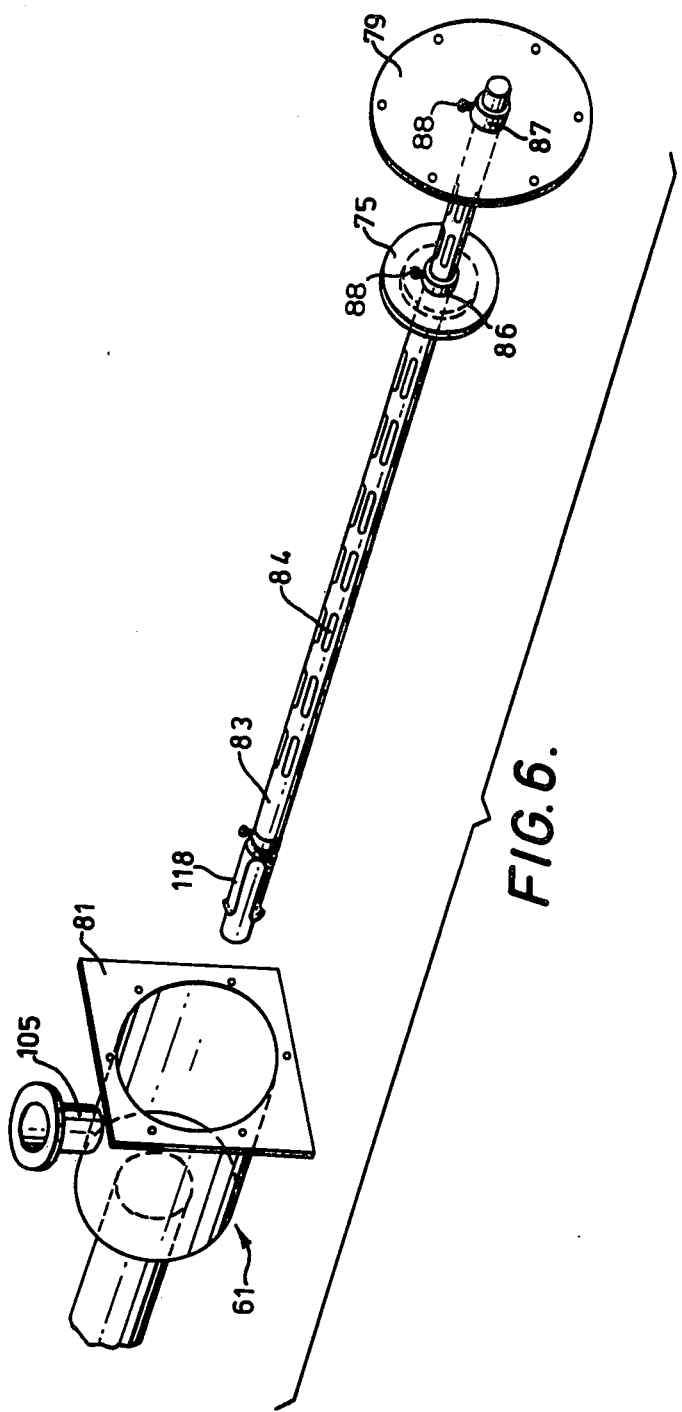
FIG. 6 shows a view in perspective of other parts of the forming section of FIG. 4 separated from one another.

The support plates 75 and 79, as can best be seen from FIG. 6, are provided with longitudinally split sleeves 86 and 87 which fit around the outer surface of the outer die 83. Circular worm screw clamps 88 compress these sleeves 86 and 87 to give a friction grip on the outer surface of the outer die 83, thus securing the support plates 75 and 79 to the outer die 83.

The left-hand end of the outer die 83 is slid into, but not secured to, the support plate 71, so that on release of the bolts 76 and 80, the outer die 83 and therewith the support plates 75 and 79 can readily be withdrawn as a unit from the casing portions 60, 61 and 62.

An inner die 82 is provided at the inlet end of the outer die 83 and is in the form of a pipe bent to provide an axial pipe portion 85 extending axially into the casing inlet portion 60 and into the inlet end of the outer die 83, and an upwardly extending pipe portion 92. The outer surface of the axial pipe portion 85 is radially spaced from the inner surface of the outer die 83 to provide an annular gap 89 for passage of the felt 11 between the axial pipe portion 85 and the outer die 83. An electrical resistance heater 90 for heating and curing the felt 11 as it passes through the gap 89 is provided within the axial pipe portion 85 and connected to supply leads 91 which extend through the vertical pipe portion 92 for connection to a source of electrical current (not shown).

Figure 5:
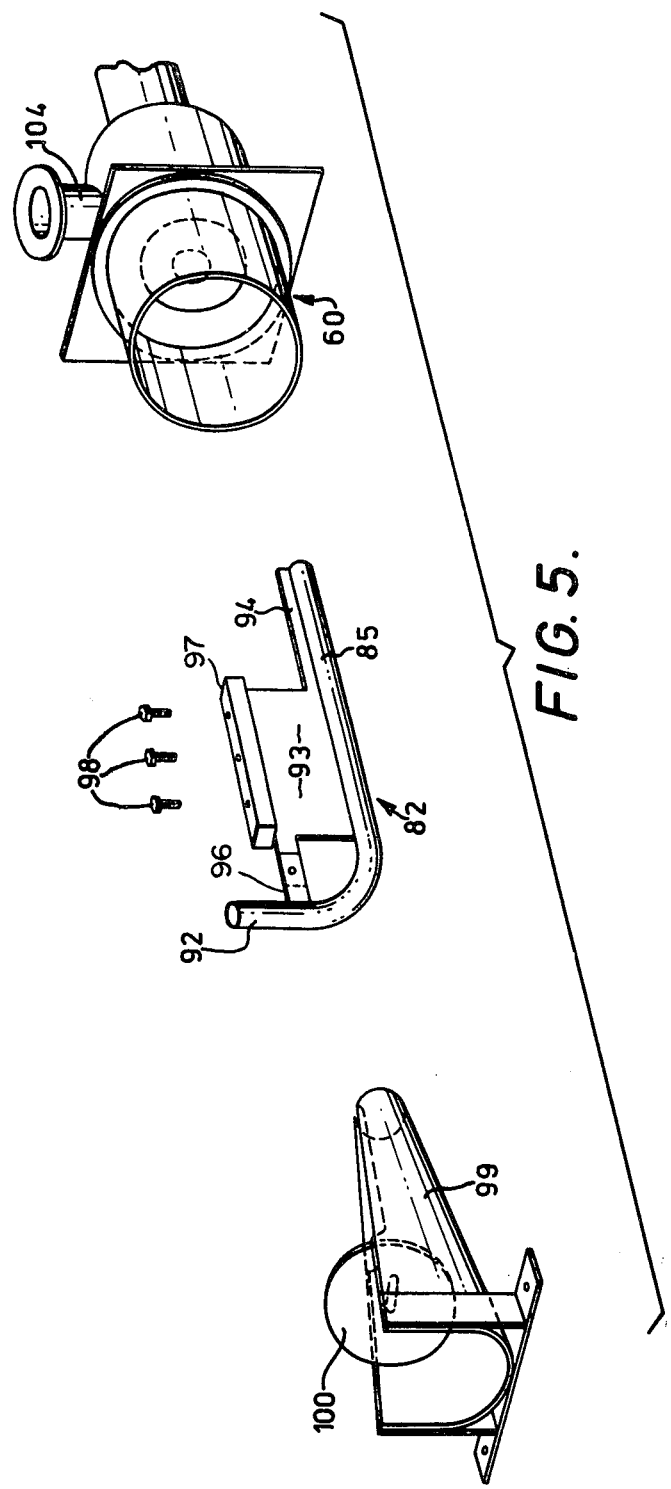
FIG. 5 shows a view in perspective of parts of the forming section of FIG. 4 separated from one another.

A flat vertical heater plate 93 having an extension 94 of lesser height than the main portion of the heater plate 93 is provided at the top of the axial pipe portion 85 in heat conducting contact therewith, and to provide greater rigidity the vertical pipe portion 92 is connected by a support bracket 96 to the heating plate 93. The extension 94 extends between the outer die 83 and the axial pipe portion 85 across the gap 89. A support block 97 shown in FIG. 5 is fixed to the top of the heater plate 93, and three bolts 98, or quick release clamps (not shown), extending through the top of the casing inlet portion 60 support the block 97, and therewith the heater plate 93 and the inner die 82, in position in the casing inlet portion 60.

For guiding the felt 11 into the forming section, and more particularly for progressively converting the cross-section of the felt 11 from a trapezoidal shape to a substantially annular shape as the felt advances to the annular gap 89, a guide channel 95 shown in FIG. 1B having a transverse cross-section which is flat at its inlet end and which is progressively increasingly curved towards its outlet end has its outlet end connected to a die entry cone 99, which extends through the open inlet end of the casing inlet portion 60 to the inlet end of the outer die 83. A wheel 100 is mounted in the inlet cone 99 and is freely rotatable about an axis transverse to the length of the inlet cone 99, the purpose of the wheel 100 being to engage the upper surface of the felt as the felt passes through the inlet cone 99 and thereby facilitate the deformation of the cross-section of the felt.

At the outlet end of the forming section, a plug 101 co-axial with the outer die 83 extends partly into the outlet end of the outer die 83 for preventing the escape of heated gas from the interior of the hollow cylindrically-deformed felt, as described below, the plug 101 being radially spaced from the outer die 83 to allow passage of the felt therebetween. A bracket 102 of the sheet metal secured to the support plate 79 supports the plug 101 in position.

The inlet casing portion 60 is provided with a gas inlet pipe 104, and the casing outlet portion 61 is provided with a gas outlet pipe 105, and a pump P is provided for recycling hot gases through a pipeline indicated diagrammatically by broken line 106 from the outlet pipe 105 to the inlet pipe, as described in greater detail below.

Figure 7:
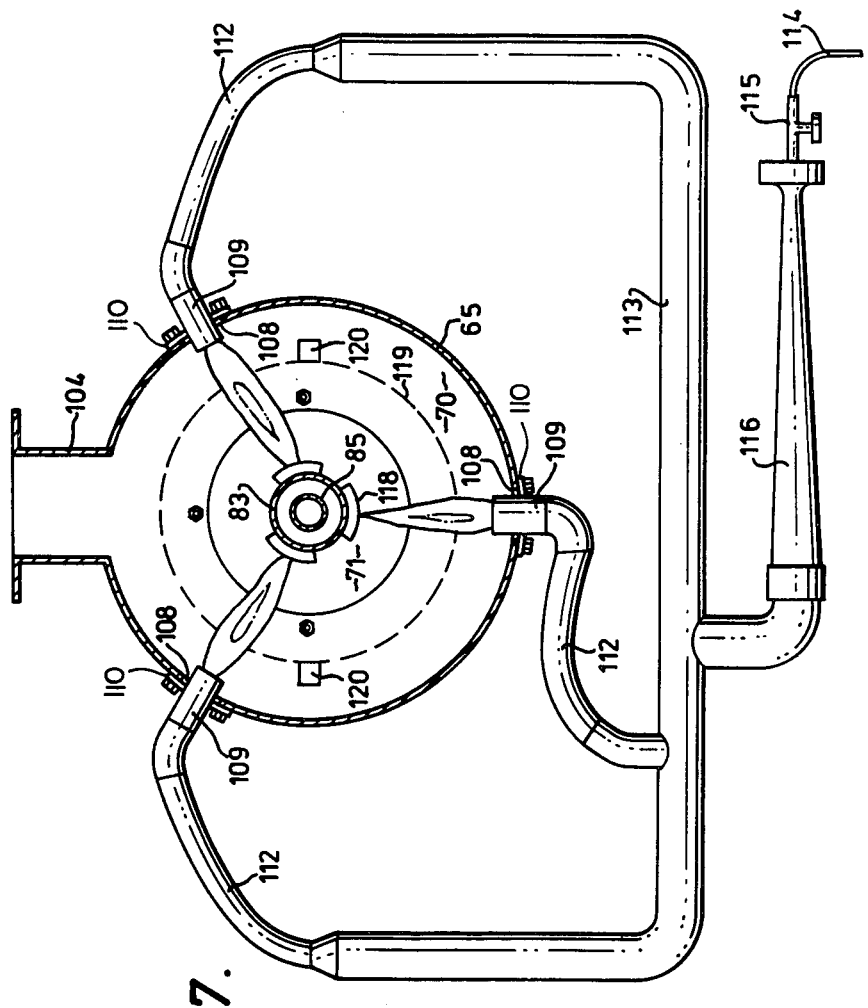
FIG. 7 shows a view taken in transverse cross-section through the forming section along the line VII—VII of FIG. 4.

FIG. 7 shows a view in transverse cross-section taken along the line VII—VII of FIG. 4 to illustrate a gas burner arrangement which is provided for curing the felt 11 as the latter passes through the casing inlet portion 60, and parts of which have been omitted from FIG. 4 in order to clarify the illustration of the forming section.

As can be seen from FIG. 7, the cylindrical wall 65 is formed with three equiangularly spaced openings 108, and three gas burner nozzles 109 extend radially through the openings 108. Each gas burner nozzle 109 is supported in position by a flange 110 seated on the external surface of the cylindrical wall 65 and bolted to the latter.

The gas burner nozzles 109 are connected by flexible connecting pipes 112 to respective arms of a gas supply manifold 113. A gas supply pipe 114, extending from a source of inflammable gas (not shown), is connected through an on-off cock 115 and a connecting pipe 116 to the gas supply manifold 113 to provide a supply of gas from the gas source to the gas burner nozzles.

The outer die 83 is provided with three flame blast guards 118 for the flames of the gas burner nozzles 109, and as a further safety precaution a perforated blast guard 119 extends around the outer die 83 at a spacing therefrom, the perforated blast guard 119 being formed with three openings for the three flames of the gas burner nozzles 109, and being supported from the partition wall 70 by support brackets 120.

The gripper mechanism, which serves as a felt feed mechanism for pulling the felt through the forming section, is illustrated in FIGS. 8 and 9 and has a base 130 and a top 131 supported above the base 130 on eight uprights 132. Upper and lower drive shafts 113, 134, 135 and 136 are rotatably supported by the uprights 132 and carry rectangular upper and lower frames 139, 140, which in turn respectively support upper and lower endless gripper conveyors 141, 142 extending parallel to the path of the tube 31 at opposite sides thereof.

Each of the gripper conveyors 141, 142 is provided with a plurality of gripper plates 143, each of which is formed with a V-shaped recess 144 for gripping contact with the periphery of the tube 31 or with tubes of different outer diameters from that of the tube 31.

Four further shafts 138 are freely rotatably supported by the uprights 132 and provided with crank arms 145 for manual rotation of the shafts 138. The shafts 138 carry bevel gears 146, which mesh with bevel gears 147 provided on vertical shafts 148. The shafts 133 to 136 are rotatable in bearings 149 which are in threaded engagement with and carried by worm threads on the vertical shafts 148. Thus, by rotation of the crank arms 145 and consequential rotation of the vertical shafts 148, the shafts 133 to 136 can be vertically displaceably adjusted to enable the vertical spacing between the support frames 139 and 140, and consequently between the gripper conveyors 141 and 142, to be adjusted to adapt the gripper mechanism for operation with tubes of different outer diameters.

The endless conveyors 141, 142 and driven by an electric motor 150 through sprockets 151, 152 and 153 and a drive chain 154. The sprockets 152 and 153 are provided on the lower ends of respective vertical drive shafts 156 and 157, which are drivingly connected to the shafts 134 and 133, respectively, through bevel gears 158 and 159. The bevel gears 158 are slidable along the vertical drive shafts 156 and 157 and connected by brackets 129 to the shafts 133, 134 so as to remain in mesh with the bevel gears 159 on vertical adjustment of the shafts 133 and 134.

The shafts 133 and 134 are drivingly connected, in turn, by sprockets 160 and 161 and drive chains 162 and 163 to a pair of sprockets 164, which are fixedly secured to shafts 165 and 166. The gripper conveyors 141 and 142 extend around sprockets 167 and 168 fixed to the shafts 165 and 166, respectively, and around sprockets 169 and 170, which are fixed to shafts 171 and 172, respectively. The shafts 165, 166, 171 and 172 are freely rotatably secured to the support frames 139 and 140.

The support frames 139 and 140 are releasably secured to the upper and lower shafts 135 and 136 to allow pivotation of the upper and lower support frames 139 and 140 about the axis of the shafts 133 and 134 into the positions shown in broken lines in FIG. 8 and indicated by reference numerals 139A and 140A to facilitate initial insertion of the tube 31 through the gripper mechanism and to provide access to the forming section 30 through the gripper mechanism 33.

The operation of the above-described apparatus is as follows:

The uncured felt 11 is fed from the supply coil 10 towards the freely rotatable support rollers 17 and before the felt 11 reaches the first of the rollers 17, the paper strip 13 is stripped from the undersurface of the felt by the stripper 15. As it passes over the rollers 17, the felt 11 is cut to the required width by the circular cutter 14, and any superfluous felt is wound up on the take-up coil 16. When the supply coil 10 has been exhausted, the take-up coil 16 may be transferred from the position from which it is shown in FIG. 1A to the freely rotatable support rollers 12 for passage through the apparatus. Alternatively, if the cutter 14 cuts the original felt strip into two strips of equal width suitable for processing by the apparatus, then when the coil 10 has been exhausted the take-up coil 16 may be moved to the position 16A, shown in broken lines in FIG. 1A and the strip on take-up coil 16 may then be processed through the apparatus.

Thus, by means of the cutter 14, the felt 11 is cut from the width shown in FIG. 10A to the width shown in FIG. 10B.

At the compaction rollers 19, 20, the felt 11 is both compacted and given a trapezoidal cross-section as shown in FIG. 10C. The purpose of this compaction is to increase the tensile strength of the felt 11 before the latter passes through the forming section 30 and thus to counteract the above-mentioned non-uniformly low strength under tension of the felt.

At the reinforcement feed section 21, the reinforcement cord 23, or any other suitable reinforcing tensile member such as yarn, rope, scrim, cloth or woven roving, is supplied from the supply reel 22 through the bath container 24, where it is supplied with a liquid binder, to the underside of the felt 11. The purpose of this reinforcement cord or other tensile member is to supplement the tensile strength of the felt.

The felt then passes through the crisping section 28 (or the modified crisping section described above with reference to FIG. 3) at which, as described above, the bonding material at and adjacent the outer surfaces of the felt 11 is at least partly cured while the bulk of the bonding material remains uncured. This partial curing of the bonding material both reduces the tackiness of the felt at its surfaces, thus reducing frictional drag on the felt as it passes through the forming section, and also further increases the tensile strength of the felt.

In addition to the modification of the cripsing unit described in reference to FIG. 3, further modifications are possible. For example, when employing gas burner nozzles, the nozzles may be shaped to product relatively thin flames so that the bonding material is cured only along strips extending longitudinally of the felt, or the burner nozzles may be shaped to produce fan-shaped flames covering the whole of the surface of the felt. A further possibility is to employ a perforated or wire mesh drum which is heated and which is rotated in contact with a surface of the felt so as to leave uncured areas on the felt surface. However, it has been found in practice preferable to cure the whole of the upper and under surfaces of the felt 11, although it has been found to be detrimental to cure the bonding material in depth within the felt since that results in greater resistance to transverse deformation of the felt in the forming section.

From the crisping unit 28, the felt passes along the guide channel 95, by which the cross-section of the felt is gradually deformed from the flat trapezoidal shape shown in FIG. 10C to a semi-circularly shaped cross-section as shown in FIG. 10D. This deformation of the cross-section of the felt is continued by the inlet cone 99 so that as the felt enters the inlet end of the outer die 83 it has a substantially closed cross-section as shown in FIG. 10E.

Before reaching the inlet end of the outer die 83, the felt is wrapped by the inlet cone 99 around the axial pipe portion 85 of the inner die 82 and heated thereby.

Simultaneously, the edges of the felt 11 slide along the heater plate 93, and subsequently along the extension 94 of the heater plate 93, and are thereby heated by heat conducted from the inner die 82 to the heater plate 93 and the extension plate 94. This heating of the felt increases the curing of the bonding material begun by the crisping unit 28.

As the felt passes through the inlet end of the outer die 83, it is further heated by the flames of the gas burner nozzles 109.

If the thickness of the felt is sufficiently small, the heating so far effected may be sufficient to complete the curing of the bonding material throughout the thickness of the felt. However, for thicker felts, further heating is required. For this purpose, the hot gases from the flames of the burner nozzles 109 travel along the casing intermediate portion 62 and pass through the openings 84 in the outer die 83 and through the felt, which by now has been formed into the longitudinally split cylindrical tube 31. The plug 101 prevents the hot gases from flowing from the interior of the tube 31 to the surrounding atmosphere, the support bracket 102 being accommodated by the longitudinal slot formed in the tube by the heater plate 93. The pump P creates a suction in the casing outlet portion 61 to draw the hot gases radially outwardly from the tube 31 through the outer die 83 and the gas outlet pipe 105, these hot gases then being recirculated into the casing inlet portion 60 through the gas inlet pipe 104.

The flow of the gases in a radially inward direction through the openings 84 of the outer die 83 tends to move or "float" the felt away from the inner surface of the outer die 83 and thus reduces the frictional drag on the felt as the felt moves through the forming section. The suction produced in the interior of the casing outlet portion 61 by the pump P helps to remove fumes from the felt, thus reducing build-up of condensed fumes on the inner and outer dies, and in addition prevents these fumes from escaping to the ambient atmosphere, so that operation of the apparatus is very clean and acceptable to the operation personnel. Moreover, this suction causes air from the ambient atmosphere to be drawn into the casing through the felt between the plug 101 and the outer die 83, and this flow of fresh air through the felt automatically cools and de-fumes the felt as the latter leaves the forming section. Any condensation of binder solids and dust from the felt which accumulate in the casing outlet portion 61 may be readily removed when the forming section is periodically cleaned.

The movement of the felt through the forming section is assisted by the pull exerted on the tube 31 by the gripper mechanism 33, which of course engages the tube after the tensile strength of the felt has been substantially increased by the curing of the felt in the forming section 30. This pull produces a tension in the tube 31 and thus in the felt, which facilitates the advance of the felt through the forming section 30 by overcoming frictional resistance between the felt and the die surfaces. Moreover, it has been found that this tension can be arranged to produce the effect of reducing the size of the cross-section of the felt in the forming section 30 and thus of reducing friction at the inner surface of the outer die 83. This tension is transmitted through the forming section 30 to the portion of the felt travelling towards the forming section and indeed as far as the supply coil 10. In this way, the pulling of the felt by gripper mechanism 33 causes the felt to advance towards and through the forming section 30 and, while the advance of the felt to the forming section 30 is assisted by a conveyor (not shown), the pulling by the gripper mechanism 33 causes the felt to travel at a slightly higher speed than the conveyor and thus subjects the felt to a "drawing" action to prevent humping and jamming of the felt.

After the gripper mechanism 33, the tube passes the cutter 35 which cuts a kerf 180 in the inner surface of the tube 31 opposite the longitudinal slit thereof as shown in FIG. 10F.

After having been cut into sections of the required length by the transverse cutter 38, the cut lengths are collected and passed through the automatic wrapping machine 39, which provides each tube section with an overwrap 181 (FIG. 11), after which the tube sections, which are now finished one piece pipe insulator sections, pass to the automatic boxing machine 40 where they are packed for storage and transportation.

Instead of employing a strip of paper 13 to prevent the successive layers of the felt from adhering to one another in the supply coil 10, the paper 13 may be replaced by a woven fabric which may be left on the felt during the passage of the felt through the apparatus and subsequently, in this case, the woven fabric may serve to supplement the tensile strength of the uncured felt, instead of the reinforcement cord 23 or other tensile member, and the reinforcement feed section 21 may be omitted.

In addition, the above-described apparatus may be readily adapted for the manufacture of one piece pipe insulator sections of different internal and/or external diameters, or indeed of articles having cross-sections other than substantially annlar cross-sections. For this purpose, the forming section 30 has been designed so that the inner and outer dies 82 and 83 can be readily removed from the forming section 30 and replaced therein by other dies of different diameter and, if required, of different cross-sectional shape. For this purpose, it is simply necessary to release the bolts 73, 76 and 79, or the quick acting toggle clamps, and to release the inlet cone 99, whereupon these parts can be removed from the casing of the forming section 30 as illustrated in FIGS. 5 and 6. This ready replacement of the dies is particularly important in the manufacture of one piece pipe insulation sections, where are often required to be produced in a range of different sizes.

While the use of a crisping section and a tensile member bonded to the felt for increasing and supplementing the tensile strength of the felt before the felt reaches the forming section have been described above, other means may be employed for this purpose. For example, a stitching mechanism may be provided for forming a longitudinal row of reinforcing stitches along the felt.

FIGS. 13 to 18 of the accompanying drawings illustrate an improved embodiment of the present invention, intended for the production of larger diameter one piece pipe insulator sections than the apparatus described hereinabove with reference to FIGS. 1 to 12.

Figure 13:
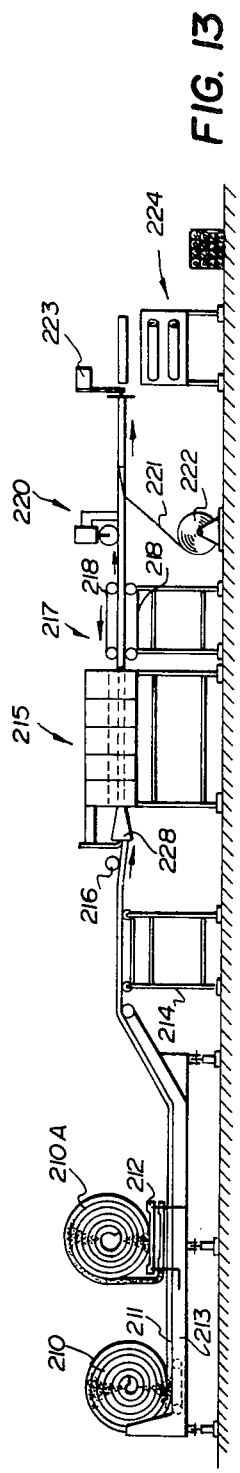
FIG. 13 shows a side view of a modified apparatus for forming pipe insulation sections.

FIG. 13 shows a diagrammatic side view of a production line for the manufacture of the pipe insulation which is generally similar to the apparatus illustrated in FIGS. 1A and 1B.

In the apparatus illustrated in FIG. 13, there is provided a supply coil 210 of uncured strip-shaped mineral wood felt 211, containing a hardenable bonding material in the form of an uncured resin. In this case, the felt 211 is provided in the roll 210 cut to the required width and already provided with a tensile stengthener, for example a scrim backing, so that the circular cutter 14 and the reinforcement feed section 21 of FIG. 1A are omitted from the apparatus of FIG. 13.

An auxiliary supply roll 210A is provided for supplying the felt 211 when the supply roll 210 has become exhausted, and an automatic splice mechanism 212 is provided for splicing together the ends of successive lengths of the felt 211 from the supply roll 210 and the auxiliary supply roll 210A.

A conveyor mechanism 213 conveys the felt 211 from the supply roll 210 and the auxiliary supply roll 210A to a further conveyor 214, from which the felt 211 passes into a forming section indicated generally by reference numeral 215, which will be described in greater detail hereinafter.

Before the felt 211 enters the forming section 215, it passes beneath a felt hold-down roller 216, which serves to correctly guide the felt 211 to the forming section 215.

In the forming section 215, the felt 211 is deformed to the required product cross-sectional shape and cured.

The cured felt is pulled, from beyond the forming section 215, by a gripping and pulling mechanism indicated generally by reference numeral 217, which is in the form of a pair of driven endless belts 218, gripping opposite sides of the cured felt 211, and which is well known to those skilled in the art and will therefore not be described in greater detail.

Beyond the gripping and pulling mechanism 217, the cured feld 211 passes a longitudinal slitting cutter, indicated generally by reference numeral 220, which may be required to form a longitudinal slit along one side of the cured felt.

A jacketing material 221, for example aluminum foil, supplied from a jacketing material supply roll 222 is then wrapped around the cured felt 211, after which the cured and wrapped felt is cut into sections of the required length by a flying transverse cut-off mechanism 223, the cut sections being packed in an automatic boxing machine indicated generally by reference numeral 224.

The forming section 215 will now be described in greater detail with reference to FIGS. 14 to 19.

At the inlet end of the forming section 215, there is provided an inlet cone 228 for deforming the cross-sectional shape of the felt 211, which is flat prior to the entry of the felt 211 into the inlet cone 228, into an annular cross-section, to thereby wrap the incoming felt 211 around an inner forming surface provided on the exterior of a cylindrical inner die or mandrel 229.

The inner die 229 extends into, and is radially inwardly spaced from, the inlet end of a cylindrical outer die indicated generally by reference numeral 230.

The outer die 230 is formed of six cylindrical outer die sections 231A through 231E, which are secured together in end-to-end relationship by telescopic interengagement of the end portions thereof.

The outer die sections 231B through 231E are formed with perforations 232 to allow hot gas to pass therethrough, as will be described in greater detail hereinafter.

The outer die 230 extends through a casing or housing indicated generally by reference numeral 234, which serves to confine the hot gas flow to and from the outer die 230.

Figure 14:
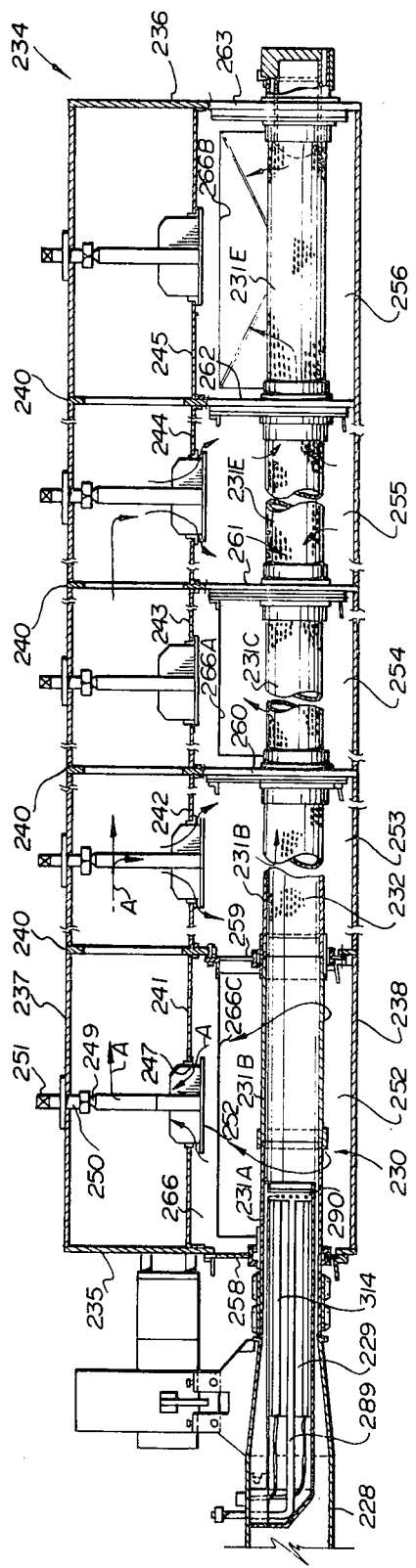
FIG. 14 shows a view taken in vertical longitudinal section through the forming section of the apparatus of FIG. 13.

As shown in FIG. 14, the housing 234 has opposite end walls 235 and 236, a top 237 and a bottom 238. A plurality of transverse vertical partition walls or bulkheads 240 are spaced apart along the length of the housing 234 and extend transversely thereof.

A longitudinal partition, formed of a plurality of horizontal transverse partition walls 241 through 245, extends between the end walls 235 and 236 and the transverse vertical partition walls 240 and serves to separate the upper portion of the interior of the housing 234 from the lower portion thereof. Each vertical partition wall 240 has an opening 240A within the upper portion of the housing interior to allow gas flow along the length of the upper portion.

Each of the horizontal transverse partition walls 241 through 245 is formed with a gas flow opening 247, which may be closed by means of a valve 248.

Each of the valves 248 has a threaded shaft 249 extending in threaded engagement with a sleeve 250, which is fixed to the housing top 237, the upper end of the shaft 249 being formed with a square-section head 251 for engagement with a turn-key (not shown). On rotation of the shaft 249 by means of this turn-key, a valve plate 252 at the lower end of the valve 248 can be raised or lowered to close or open the respective gas flow opening 247.

The lower portion of the housing 234 is separated by the vertical partition walls 240 and releasable closure plates 258 through 263, which will be described in greater detail hereinafter, into a plurality of die chambers 252 to 256.

Figure 15:
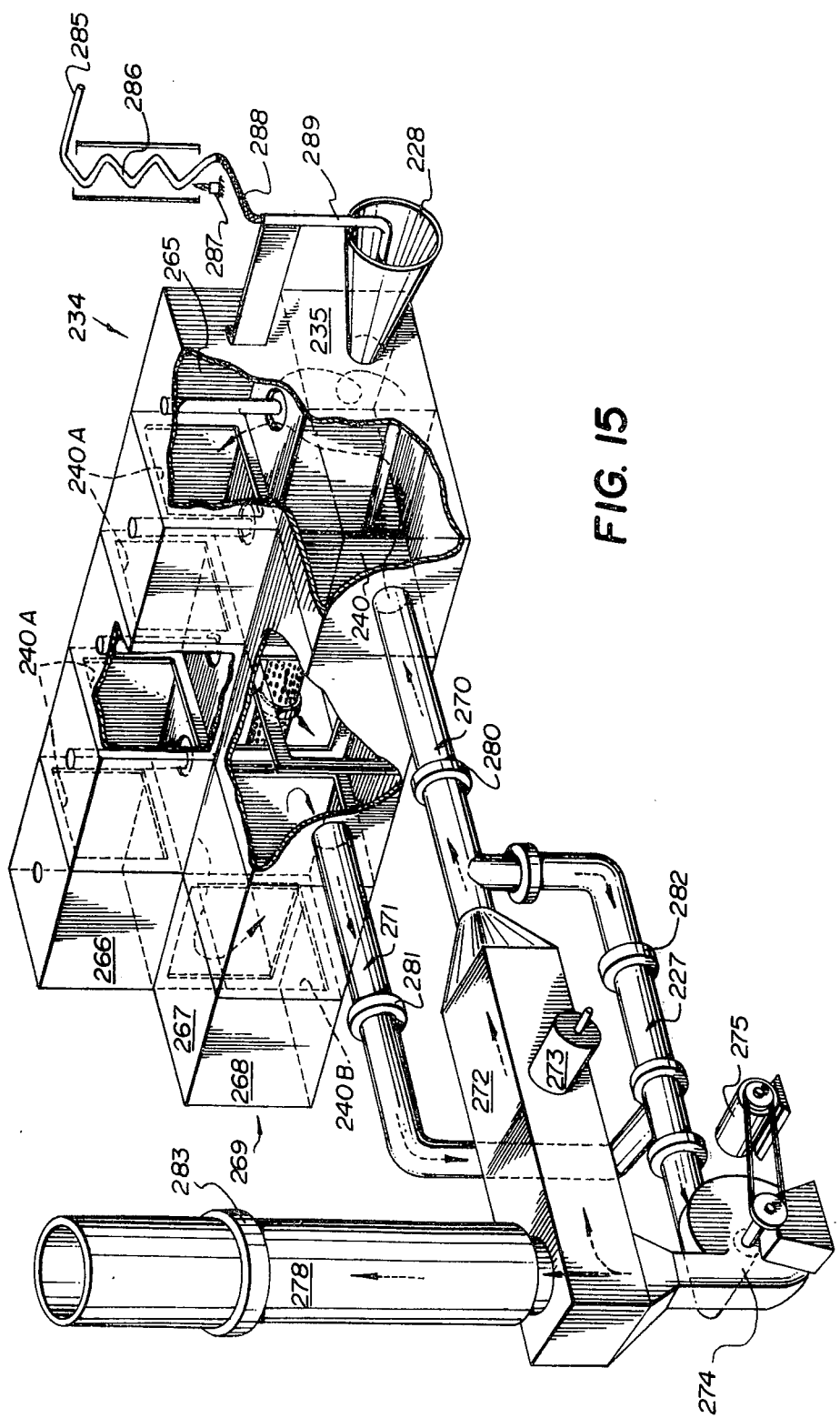
FIG. 15 shows a partially broken-away view in perspective of a housing enclosing the forming section of FIG. 14 and of a burner, pump and ducting arrangement for supplying hot gas to, and exhausting hot gas from, the housing.

Referring now to FIG. 15, the front of the housing 234 is closed by a wall 265. The upper portion of the housing 234 is closed at its rear by a rear wall 266.

At its lower portion, the housing 234 has a rearward extension 269 having a top 267 and a rear wall 268.

Figure 16:
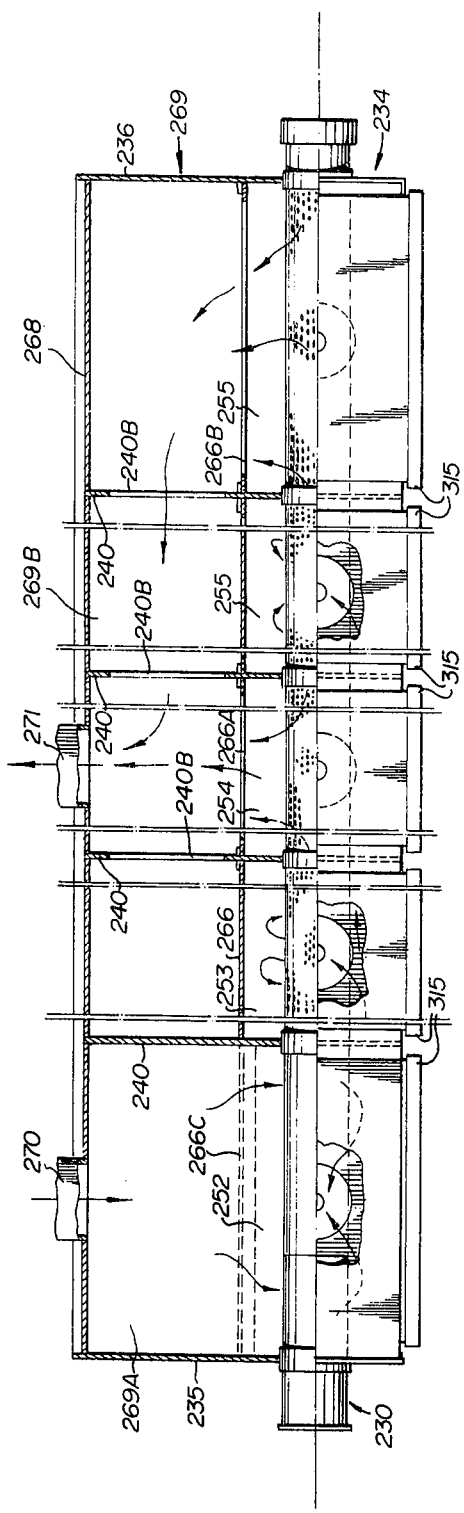
FIG. 16 shows a view taken in horizontal longitudinal section through the housing of FIG. 15.

As can be seen from the plan view of the housing 234 shown in FIG. 16, which view is partially broken away in section to reveal the interior of the rearward extension 269 and parts of the die chambers 252 through 256, one of the vertical partition walls 240, which is the first of the vertical partition walls 240 in the direction of advance of the felt 211, extends rearwardly across the interior of the rearward extension 269 to divide the latter into a gas inlet housing portion or chamber 269A and a gas outlet housing portion or chamber 269B, the remaining vertical partition walls 240 being formed with square openings 240B and the die chambers 254 and 256 communicating with the gas outlet chamber 269B through openings 266A and 266B in the rear wall 266 to allow the hot gas to escape from the die chambers 254 and 256 to the gas outlet chamber 269B. The gas inlet chamber 269A communicates with the die chamber 252 through an opening 266C in the rear wall 266.

A hot gas supply duct 270 communicates with the gas inlet chamber 269A, and a hot gas return duct 271 communicates with gas outlet chamber 269B.

The hot gas supply duct 270 extends from a burner housing 272 (FIG. 15) provided with a gas burner 273.

A gas pump 274, driven by an electric motor 275, communicates with the burner housing 272.

A by-pass duct 277, communicating with the air supply duct 270, extends to the inlet of the air pump 274, and the hot gas return duct 271 communicates with the by-pass duct 277.

An exhaust stack 278 extends upwardly from the burner housing 272.

The hot gas supply duct 270 is provided with an inlet valve 280 for controlling the flow of hot gas into the housing 234, and the hot gas return duct 271 is provided with an exhaust valve 281 for controlling the exhaustion of the hot gas from the housing 234.

A by-pass valve 282 is provided in the by-pass duct 277 for controlling flow of the hot gas from the hot gas supply duct 270 to the gas pump 274, and the exhaust stack 278 is provided with a damper 283.

A compressed air inlet pipe 285 has a downwardly extending coiled section 286 associated with a burner 287, and communicates through a flexible hose 288 and an inlet pipe 289 with the interior of the inner die or mandrel 229 (FIG. 14), which is provided with hot gas outlet openings 290.

The manner in which successive sections of the outer die are connected together and supported in the housing will now be described with reference to FIG. 17, which illustrates the interconnection of the ends of the outer die sections 231B and 231C.

The outer die section 231B is provided with an end sleeve 291 welded thereto, and the outer die section 231C is provided with an end sleeve 292 welded thereto. A further end sleeve 293, welded around the end sleeve 292, telescopically receives the end sleeve 291.

Figure 17:
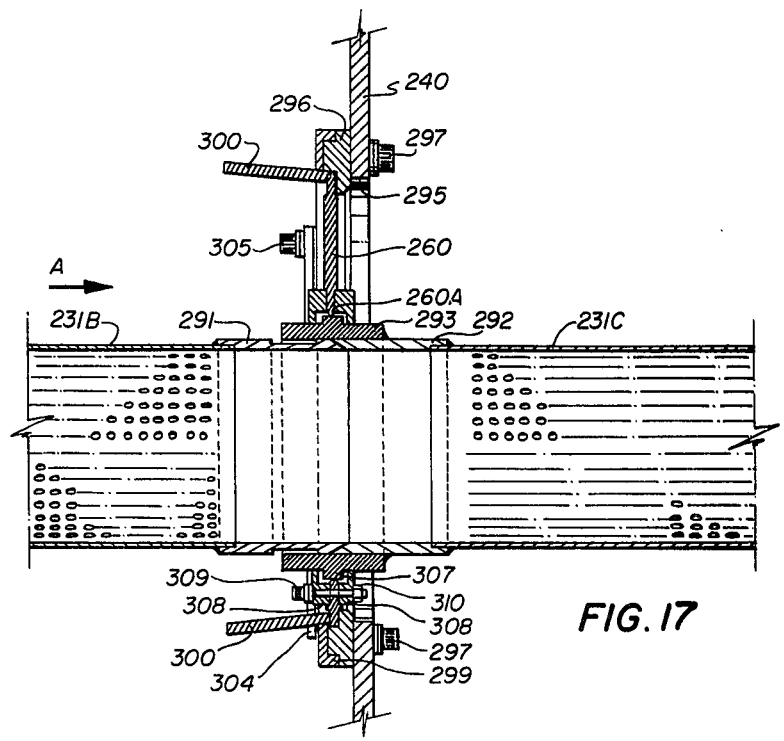
FIG. 17 shows a broken-away view, taken in cross-section along the line XVII—XVII of FIG. 18, through one of a plurality of closure plates and an associated quick-release securing device supporting the outer die in the housing of FIGS. 14 to 16.

The vertical transverse partition wall 240, shown broken away in FIG. 17, separates the successive chambers 253 and 254 (FIG. 14) of the housing 234, and is formed with an opening 295 which is of considerably larger cross-section than the outer die 230 so as to be able to accommodate replacement outer dies of different cross-sectional sizes and shapes. The opening 295 is closed by a respective one of the closure plates 260 extending around the outer die 230. A similar opening 295 is provided in each of the other vertical partition walls 240 and the end walls 235 and 236.

An annular locating member 296 is secured to the vertical transverse partition wall 240 by bolts 297, and a die locking ring 299, provided with handles 300, releasably secures the closure plate 260 in the position shown in FIG. 17.

The die locking ring 299 is retained in position, while being allowed to be rotatable relative to the locating member 296, by means of two locking rings retainers 304. Bolts 305 in threaded engagement in bushes (not shown) secured to the vertical transverse partition wall 240 serve to retain the locking ring retainers 304.

For receiving the outer die 230 therethrough, the closure plate 260 is formed with a circular opening, the edge of which is in the form of a knife edge 260A, which engages a raised portion 307 of the end sleeve 293 in a slidable manner to allow for expansion and contraction of the sections of the outer die 230 as the latter is heated and cooled.

Die retaining rings 308 extend around the inner edge of the closure plate 260 and are secured thereto by bolts 309 and nuts 310, the die retaining rings 308 extending inwardly at opposite sides of the end sleeve raised portion 307 for retaining the latter.

The rotatable die locking ring 299 releasably secures the closure plate 260, and thus the outer die 230, in position in the opening 295. To this end, the die locking ring 299 is formed with a circular inner periphery interrupted by diametrically opposite flat faces 311, and the closure plate 260 has a circular outer periphery interrupted by corresponding diametrically opposite flat faces 312. The inner periphery of the die locking ring 299 and the outer periphery of the closure plate 260 are dimensioned so that the closure plate 260 can be displaced through the die locking ring 299, in a direction parallel to the axis of the outer die 230, to enable the closure plate 260 to be moved into or out of the position in which it is shown in FIG. 17 when the die locking ring 299 is rotated into an unlocked position.

Figure 18:
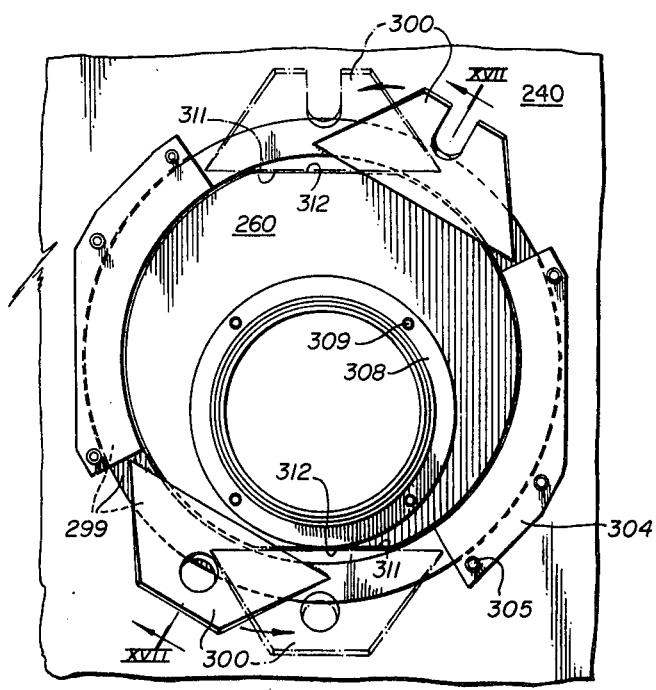
FIG. 18 shows a view taken in the direction of the arrow A of FIG. 17.

The rotation of the die locking ring 299 is effected by engagement of a suitable tool (not shown) in the handles 300, which are shown in full lines in their locked positions, and in broken lines in their unlocked positions, in FIG. 18.

In the unlocked position of the die locking ring 299, the flat faces 311 of the die locking ring extend parallel to the flat faces 312 of the closure plate 260 and therefore the closure plate 260 can be displaced past the flat faces 311.

When the die locking ring is rotated into its locked position, the flat faces 311 and 312 are no longer parallel, and the flat faces 311 of the die locking ring 299 overlap the circular portion of the outer periphery of the closure plate 260, thus preventing displacement of the latter through the die locking ring 299. In this manner, the closure plate 260 is locked in the position in which it is shown in FIG. 17.

The operation of the above-described forming section 215 is as follows.

As the felt 211 is wrapped around the inner die 229 and advances past the inner die 229 and along the outer die 230, the inner surface of the felt is at least partially cured by hot air supplied from a compressed air source (not shown) through the pipes 285, 288 and 289 and heated by the burner 287, this air being expelled from the hot air discharge openings 290 in the inner die 229. The felt 211 is also heated by conduction from the outer surface of the inner die 229 of heat provided by electrical heating elements 314 within the inner die 229.

The hot gas supplied into the die chamber 252 from the hot gas supply duct 270 circulates around the outer die sections 231A and 231B and passes through the overlying hot gas flow opening 247 and the upper portion of the housing 234, as indicated by arrows A, to the die chamber 253 and 255.

In the chambers 253 and 255, this hot gas flows inwardly through the perforations 232 in the outer die sections 231B and 231D and inwardly through the thickness of the felt, which is now cylindrical. This hot gas then passes along the interior of the felt and outwardly through the outer die sections 231C and 231E, and thence into the gas outlet chamber 269B as shown in FIG. 16, and into the hot gas return duct 271 for recirculation.

As will be apparent, the valves 248 can be opened or closed to vary the rate of flow of the hot gas to the chambers 252 and 256 as may be desired to produce optimum curing of the felt.

The rate of flow of the hot gas to and from the housing 234 is controlled by the valves 280 to 282, and excess hot gas is vented through the stack 278 under control of the damper 283.

When it is desired to replace the inner and outer dies, cover plates or doors 315 (FIG. 16) are removed from access openings (not shown) in the front wall 265 of the housing 234 to provide access to the interior of the housing 234.

The closure plates 258 to 263 are then removed, in succession, by firstly rotating the handles 300 and therewith the die locking rings 301 to release the closure plates. The outer die section 231A to 231E can then be successively disconnected from one another and withdrawn from the housing 234, together with the closure plates 258 to 263.

The outer die can then be replaced by a new outer die (not shown) of, for example, larger cross-section.

We claim:

1. Apparatus for forming articles from a longitudinally advancing strip-shaped felt of fibrous material containing hardenable bonding material, said apparatus comprising:
   inner and outer stationary forming surfaces spaced apart for receiving the felt therebetween in sliding contact with said forming surfaces at opposite sides of the felt;
   said inner surface being provided on an inner die and said outer surface being provided on an outer die extending around said inner die;
   said outer die defining openings therein for the flow of hot gas therethrough;
   housing means extending around and spaced from said outer die for confining the gas flow;
   said housing means defining openings therein;
   said outer die extending longitudinally through said openings and said openings being larger than the transverse dimensions of said outer die;
   closure means for closing said openings around said outer die;
   readily releasable means for securing said closure means to said housing, whereby said outer die is readily replaceable by an outer die of different transverse dimensions;
   gas supply means for providing the flow of hot gas through said housing means and said outer die openings to the felt for curing the felt;
   means for gripping the felt and pulling the felt between said inner and outer dies, said means for gripping and pulling being disposed beyond said outer die in the direction of advance of the felt; and
   means for cutting the felt into separate lengths, said means for cutting being disposed beyond said means for gripping and pulling in the direction of advance of the felt.

2. Apparatus as claimed in claim 1, wherein said housing means comprises a gas inlet portion and a gas outlet portion said apparatus further including a gas inlet duct communicating with said gas inlet portion and a gas outlet duct communicating with said gas outlet portion, one of said closure means closing off said gas inlet portion from said gas outlet portion.

3. Apparatus as claimed in claim 1, and further comprising a support mounting said inner die, said support being shaped to form a longitudinal slot along the felt.

4. Apparatus as claimed in claim 1, and further comprising felt contacting members adjacent the path of travel of the felt before said forming surfaces and spaced apart for contact with opposite sides of the felt, and means for heating said felt contacting members and thereby curing the bonding material at and adjacent opposite sides of the felt.

5. Apparatus as claimed in claim 4, wherein said felt contacting members comprise a pair of parallel plates disposed at opposite sides of the path of travel of the felt.

6. Apparatus as claimed in claim 1, and further comprising rollers for compacting the felt, said rollers being provided on the path of travel of the felt before said forming surfaces.

7. Apparatus as claimed in claim 6, and further comprising means defining an outlet for the felt in an outlet portion of said housing means, the outlet being in communication with the ambient atmosphere and said extractor pump to allow air to be drawn from the ambient atmosphere and through the felt by said pump.

8. Apparatus as claimed in claim 7, and further comprising a slot cutting device disposed either before or after said forming surfaces on the path of travel of the felt; said slot cutting device being adapted to cut a slot through at least part of the thickness of the felt.

9. Apparatus as claimed in claim 1, wherein said means for gripping and pulling the felt comprises:
   a pair of endless members disposed at opposite sides of the path of travel of the felt;
   grippers carried by said endless members, said grippers being shaped for gripping engagement with the felt; and
   means for driving said endless members.

10. Apparatus as claimed in claim 9, and further comprising a support carrying one of said endless members, and means for moving said support towards and away from the path of the felt.

11. Apparatus as claimed in claim 9, wherein said grippers have mutually inclined gripping surfaces to facilitate engagement of said grippers with felts of different dimensions.

12. Apparatus as claimed in claim 1, and further comprising a reinforcement supply device disposed before said stationary forming surfaces for supplying a tensile member to the felt to supplement the tensile strength of the felt.

13. Apparatus as claimed in claim 1, wherein said means for gripping and pulling the felt comprises gripping members for gripping the felt therebetween and means for displacing said gripping members continuously at a variable constant speed.

14. Apparatus as claimed in claim 13, and further comprising a pair of spaced endless belts on which said gripping members are mounted, and means for adjusting the spacing between said belts.

15. Apparatus as claimed in claim 14, and further comprising:
   a pair of supports on each of which one of said pair of spaced endless belts is mounted; and
   pivot means located at adjacent ends of said pair of supports for permitting said supports to be pivoted into an open position in which said belts are spaced apart from one another by more than the usual distance.

16. Apparatus as claimed in claim 1, and further comprising plug means adapted to fit within the felt at an outlet end of the outer die for preventing escape of hot gas longitudinally of the felt.

17. Apparatus for forming articles from longitudinally advancing strip-shaped felts of fibrous material containing hardenable bonding material, said apparatus comprising:
   a tubular outer die;
   a tubular inner die extending into an inlet end of said tubular die;

means for releasably supporting said inner tubular die in position in the inlet end of said outer tubular die with a spacing therebetween;

said outer tubular die comprising a plurality of separable die sections;

means for releasably connecting said die sections together in end-to-end relationship; whereby said die sections are readily separable to facilitate replacement of said tubular outer die;

said outer die defining openings therein for the flow of hot gas therethrough;

housing means extending around and spaced from said outer die for confining the gas flow;

said housing defining openings therein;

said outer die extending longitudinally through said openings and said openings being larger than the transverse dimensions of said outer die;

closure means for closing said openings around said outer die;

readily releasable means for securing said closure means to said housing, whereby said outer die is readily replaceable by an outer die of different transverse dimensions;

gas supply means for providing the flow of hot gas through said housing means and said outer die openings to the felt for curing the felt;

means for gripping the felt and pulling the felt between said inner and outer dies, said means for gripping and pulling being disposed beyond said outer die in the direction of advance of the felt; and means for cutting the felt into separate lengths, said means for cutting being disposed beyond said means for gripping in the direction of advance of the felt.

18. Apparatus as claimed in claim 17, wherein said die sections have telescopically interengageable end portions.

19. Apparatus as claimed in claim 17, wherein said closure means include knife edges for slidably supporting said outer die.

20. Apparatus as claimed in claim 17, further comprising:

a longitudinal partition extending along and across the interior of said housing means;

a plurality of transverse partitions extending from one side of said longitudinal partition around said outer die and separating a plurality of chambers extending around said tubular outer die;

means defining an inlet opening and an outlet opening communicating with the interior of said housing means at the opposite side of said longitudinal partition for the entry of hot gas to and from said housing means;

said gas supply means communicating with said inlet opening; and valve means in said longitudinal partition for adjustably controlling the flow of the hot gas to and from the chambers.

21. Apparatus as claimed in claim 17, wherein said closure means comprise plates defining openings for receiving said tubular outer die therethrough and knife edges around said plate openings for supporting said tubular outer die.

22. Apparatus as claimed in claim 20, wherein said transverse partitions define some of said housing openings.

* * * * *